United States Patent
Pan et al.

(10) Patent No.: US 10,752,769 B2
(45) Date of Patent: Aug. 25, 2020

(54) HYDROCARBON POLYMER ADDITIVES AND COMPOSITIONS PREPARED THEREOF

(71) Applicant: ExxonMobil Chemical Patents Inc., Baytown, TX (US)

(72) Inventors: Xiao-Dong Pan, Baytown, TX (US); Bobby J. Harper, Jr., Houston, TX (US); James M. Blake, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 79 days.

(21) Appl. No.: 16/012,108

(22) Filed: Jun. 19, 2018

(65) Prior Publication Data

US 2019/0092937 A1     Mar. 28, 2019

Related U.S. Application Data

(60) Provisional application No. 62/563,290, filed on Sep. 26, 2017.

(51) Int. Cl.

| | |
|---|---|
| *C08L 47/00* | (2006.01) |
| *C08L 9/00* | (2006.01) |
| *C08L 7/00* | (2006.01) |
| *C08F 36/06* | (2006.01) |
| *C08F 36/08* | (2006.01) |
| *C08F 210/14* | (2006.01) |
| *B60C 1/00* | (2006.01) |

(52) U.S. Cl.
CPC ............ *C08L 47/00* (2013.01); *B60C 1/0016* (2013.01); *B60C 1/0025* (2013.01); *C08F 36/06* (2013.01); *C08F 36/08* (2013.01); *C08F 210/14* (2013.01); *C08L 7/00* (2013.01); *C08L 9/00* (2013.01); *C08F 2500/02* (2013.01); *C08F 2800/20* (2013.01); *C08L 2205/03* (2013.01); *C08L 2207/04* (2013.01)

(58) Field of Classification Search
CPC .................................. C08L 7/00; C08L 91/00
See application file for complete search history.

(56) References Cited

U.S. PATENT DOCUMENTS

2016/0032215 A1* 2/2016 Voge ........................ B29B 7/421
                                                                508/131

FOREIGN PATENT DOCUMENTS

EP          1 526 002 A      4/2005

OTHER PUBLICATIONS

Abe et al., Structure and Properties of Poly(Vinyl Cyclohexane), Polymer Letters, vol. 7, pp. 427-435 (1969).
Donker, "The Chemistry of Tackifying Resins", Technical Information Paper, pp. 149-164.

* cited by examiner

*Primary Examiner* — Jeffrey C Mullis

(57) ABSTRACT

The present invention provides an elastomeric composition comprising: at least one first elastomer; at least one first hydrocarbon polymer additive; and at least one second hydrocarbon polymer additive; wherein each of the first hydrocarbon polymer additive and the second hydrocarbon polymer additive is selected from the group consisting of: $C_5$ aliphatic resins, $C_9$ aromatic resins, mixed $C_5/C_9$ resins, pure aromatic monomer resins, dicyclopentadiene (DCPD) resins, aromatic modified cycloaliphatic resins, coumarone indene resins, rosin resins, rosin esters, terpene resins, modified terpene resins, terpene phenolic resins, and hydrogenated resins thereof. The composition may further comprise a second elastomer which is immiscible with the first elastomer.

12 Claims, 1 Drawing Sheet

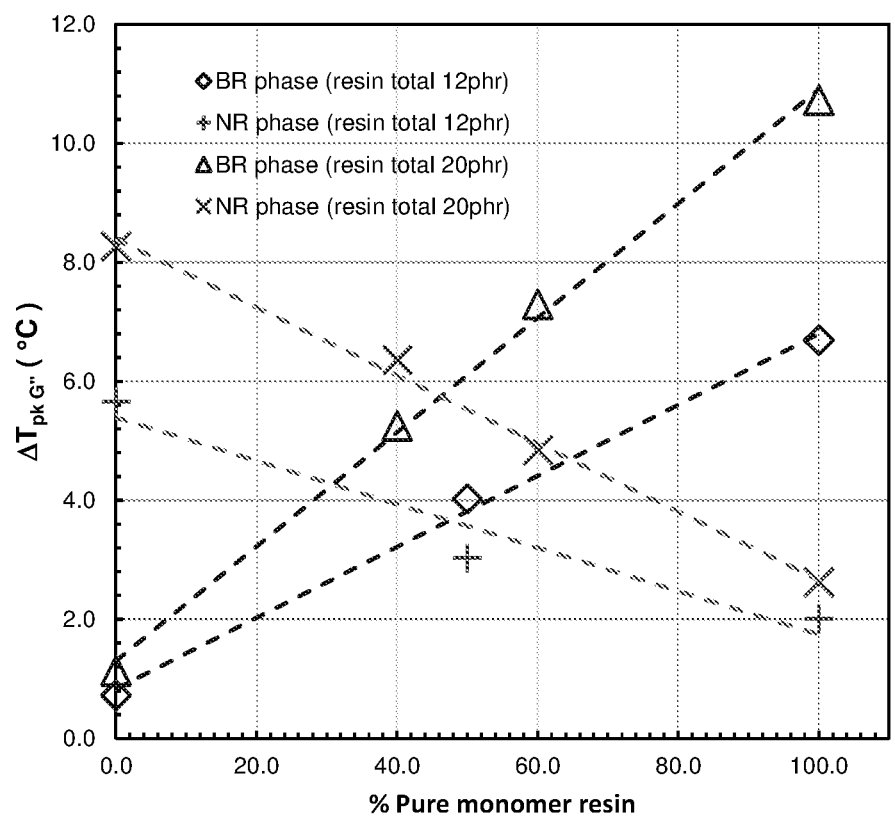

HYDROCARBON POLYMER ADDITIVES AND COMPOSITIONS PREPARED THEREOF

CROSS-REFERENCE TO RELATED APPLICATIONS

This application claims priority to U.S. Ser. No. 62/563,290, filed Sep. 26, 2017, herein incorporated by reference.

FIELD OF THE INVENTION

This invention relates to compositions comprising a blend of hydrocarbon polymer additives. More particularly, this invention relates to compositions comprising a combination of hydrocarbon polymer additives and cured elastomeric rubber articles made therefrom.

BACKGROUND OF THE INVENTION

Elastomeric compositions are used in a wide variety of applications, including tire components such as treads and sidewalls, hoses, belts, footwear components, and vibration isolation devices. The selection of ingredients for the commercial formulation of an elastomeric composition depends upon the balance of properties desired, the application, and the application's end use. For example, running properties of a tire, in particular of a pneumatic tire, are greatly dependent on the rubber composition of the tread, and particularly stringent requirements are therefore placed upon the composition of the tread mixture. A variety of attempts have therefore been made to improve the properties of the tire by varying the polymer components and the fillers in the tread mixture. A factor that has to be taken into account here is that improving one of the properties of the tire often has the concomitant effect of impairing another property. Among the properties that are correlated, where improvement of one of the properties is usually attended by impairment of at least one other property, are the trio of abrasion, rolling resistance and wet grip.

The use of polybutadiene (BR) in rubber mixtures for tire treads can by way of example improve abrasion performance, but this is achieved by reducing wet grip. Another factor important for tires, however, is gasoline consumption, and the tires should therefore have minimized rolling resistance. Improvements achieved in the field of tires, for example, in terms of abrasion and rolling resistance, should therefore as far as possible be achieved at the same level of wet grip.

Therefore, hydrocarbon resins are used in tire rubbers for enhancement of tire performance characteristics such as traction and wear resistance. Truck, Bus, and Radial (TBR) and winter Powertrack Cityracing (PCR) tire treads and tire sidewall compounds can be made of an immiscible blend of natural rubber (NR) and high-cis polybutadiene rubber (cis-BR). For example, EP Patent No. 1526002A1 discloses, for good ease of production, good durability, and good handling of pneumatic tires, a rubber mixture for the tread base which comprises at least one diene rubber, at least one filler, from 0.5 to 10 phr of at least one aromatic hydrocarbon resin, and from 1.5 to 10 phr of at least one fatty acid and/or metal salt of a fatty acid and/or fatty acid derivative. The examples reveal tread base mixtures with 70 phr of natural rubber, 30 phr of polybutadiene, and 2 phr of an aromatic hydrocarbon resin. However, there is only single hydrocarbon resin used in this example.

Various hydrocarbon resins are available that can be used as additives, such as $C_5$ aliphatic resins, $C_9$ aromatic resins, mixed $C_5/C_9$ resins, aromatic pure monomer resins, dicyclopentadiene (DCPD) resins, aromatic modified cycloaliphatic resins, coumarone indene resins, rosin resins, terpene resins, modified terpene resins, terpene phenolic resins, and hydrogenated resins thereof. Different resins may differ in chemical composition, molecular structure and molecular weight distribution, and thus may have different impact on properties of elastomeric compositions.

Therefore, there still is a need to develop an elastomeric composition with balanced and adjustable properties by utilizing a blend of hydrocarbon polymer additives.

SUMMARY OF THE INVENTION

In one aspect, the present invention provides a composition comprising a first elastomer; a first hydrocarbon polymer additive; and a second hydrocarbon polymer additive, wherein the second hydrocarbon polymer additive is different from the first hydrocarbon polymer additive; and wherein each of the first hydrocarbon polymer additive and the second hydrocarbon polymer additive is selected from the group consisting of: $C_5$ aliphatic resins, $C_9$ aromatic resins, mixed $C_5/C_9$ resins, aromatic pure monomer resins, dicyclopentadiene (DCPD) resins, aromatic modified cycloaliphatic resins, coumarone indene resins, rosin resins, terpene resins, modified terpene resins, terpene phenolic resins, hydrogenated resins thereof, and combinations thereof.

DESCRIPTION OF THE DRAWINGS

FIG. 1 is a plot of the shift in temperature for the peak in G" for the different polymer phases in cured compounds made of an immiscible blend as a function of the proportion of pure monomer resin in inventive elastomeric compositions.

DETAILED DESCRIPTION OF THE INVENTION

The present invention provides a composition comprising at least one first elastomer, at least one first hydrocarbon polymer additive, and at least one second hydrocarbon polymer additive, wherein each of the first hydrocarbon polymer additive and the second hydrocarbon polymer additive is selected from the group consisting of: $C_5$ aliphatic resins, $C_9$ aromatic resins, mixed $C_5/C_9$ resins, aromatic pure monomer resins, dicyclopentadiene (DCPD) resins, aromatic modified cycloaliphatic resins, coumarone indene resins, rosin resins, terpene resins, modified terpene resins, terpene phenolic resins, and hydrogenated resins thereof. The composition may further comprise a second elastomer which is immiscible with the first elastomer.

The present invention also provides an article comprising the composition and a use of the combination of hydrocarbon polymer additives in adjusting properties of the elastomeric composition.

The term "phr" means parts per hundred parts of rubber (by weight), and is a measure common in the art wherein components of a composition are measured relative to the total of all of the elastomer (rubber) components. The total phr or parts for all rubber components, whether one, two, three, or more different rubber components is present in a given recipe is always defined as 100 phr. All other non-rubber components are ratioed against the 100 parts of rubber and are expressed in phr.

Compositions

The inventive compositions may comprise at least one first elastomer, at least one first hydrocarbon polymer additive, at least one second hydrocarbon polymer additive. The elastomeric compositions may further comprise a second elastomer, which is immiscible with the first elastomer, some fillers, processing oil, antidegradants, curatives, and other additives.

The inventive compositions are useful in a variety of applications, particularly pneumatic tire components, hoses, belts, solid tires, footwear components, rollers for graphic arts applications, vibration isolation devices, pharmaceutical devices, adhesives, sealants, protective coatings, and bladders for fluid retention and curing purposes.

In one embodiment, the various elastomers are generally present in the elastomeric composition at 100 phr either alone, or in some combination with one another, with hydrocarbon polymer additives being present from 5 to 90 phr.

Elastomers

The term "elastomer," as used herein, refers to any polymer or combination of polymers consistent with the ASTM D1566 definition, incorporated herein by reference. As used herein, the term "elastomer" may be used interchangeably with the term "rubber."

In some embodiments, the composition may comprise a first elastomer and a second elastomer. The second elastomer is immiscible with the first elastomer. Blends of elastomers may be reactor blends and/or melt mixes. The individual elastomer components may be present in various conventional amounts, with the total elastomer content in the elastomeric composition being expressed as 100 phr in the formulation.

Typical first or second elastomer components that may be included in the inventive elastomeric compositions include butyl rubber, halogenated butyl rubber, branched ("star-branched") butyl rubber, halogenated star-branched butyl rubber, poly(isobutylene-co-p-methylstyrene), halogenated poly(isobutylene-co-p-methylstyrene), general purpose rubber, natural rubber, polybutadiene rubber, polyisoprene rubber, styrene-butadiene rubber, styrene-isoprene-butadiene rubber, isoprene-butadiene rubber, high cis-polybutadiene, polypentenamer rubber, epoxidized natural rubber, polychloroprene rubber, styrene-isoprene rubber, ethylene-propylene rubber, ethylene-propylene-diene rubber, nitrile rubber, brominated butyl rubber, chlorinated butyl rubber, star-branched polyisobutylene rubber, and mixtures thereof. Useful elastomers can be made by any suitable means known in the art, and the invention is not herein limited by the method of producing the elastomer.

Examples of the immiscible elastomer component(s) can be selected from natural rubbers ("NR"), polyisoprene rubber ("IR"), poly(styrene-co-butadiene) rubber ("SBR"), polybutadiene rubber ("BR"), poly(isoprene-co-butadiene) rubber ("IBR"), styrene-isoprene-butadiene rubber ("SIBR"), styrene-isoprene rubber ("SIR"), butyl rubber ("IIR"), halogenated butyl rubber, poly(isobutylene-co-p-methylstyrene), halogenated poly(isobutylene-co-p-methylstyrene), polypentenamer rubber (PR), epoxidized natural rubber ("ENR"), polychloroprene rubber ("CR"), nitrile rubber ("NBR"), ethylene-propylene rubber, ethylene-propylene-diene rubber, and mixtures thereof. Exemplary pairs of the first elastomer and the second elastomer are selected from the group consisting of: natural rubber/polybutadiene rubber, butyl rubber/cis-polybutadiene rubber, butyl rubber/poly(styrene-co-butadiene) rubber, natural rubber/trans-polypentenamer rubber, natural rubber/poly(styrene-co-butadiene) rubber, polybutadiene rubber/poly(styrene-co-butadiene) rubber with high bound styrene content, or polybutadiene rubber/styrene-isoprene rubber with of high bound styrene content.

In one embodiment, the first elastomer is a natural rubber being described in detail by Subramaniam in RUBBER TECHNOLOGY 179-208 (Maurice Morton, ed., Chapman & Hall 1995). Desirable embodiments of the natural rubbers are selected from Malaysian rubber such as SMR CV, SMR 5, SMR 10, SMR 20, and SMR 50 and mixtures thereof, wherein the natural rubbers have a Mooney viscosity at 100° C. (ML 1+4) of 30 to 120, more preferably from 40 to 65. The Mooney viscosity test referred to herein is in accordance with ASTM D-1646. The natural rubber is preferably present in the composition from 90 to 10 phr, more preferably 90 to 20 phr, and much more preferably 90 to 30 phr, wherein a preferred range of natural rubber may be any upper phr limit combined with any lower phr limit described herein.

In another embodiment, the second elastomer is a polybutadiene (BR) rubber, particularly includes high cis-polybutadiene ("cis-BR") or polybutadiene rubber with a vinyl content of less than 32%. By "cis-polybutadiene" or "high cis-polybutadiene", it is meant that 1,4-cis polybutadiene is used, wherein the amount of the cis component is at least 90%. The Mooney viscosity of the polybutadiene rubber as measured at 100° C. (ML 1+4) may range from 35 to 70, more preferably 35 to 65, much more preferably 35 to 60. Some commercial examples of useful synthetic rubbers are Diene™ rubbers (Firestone Polymers), and BUDENE™ 1207 or BR 1207 (Goodyear Chemical Company). A desirable rubber is high cis-polybutadiene (cis-BR). An example of high cis-polybutadiene is Diene™ 140 ND (Firestone Polymers).

In yet another embodiment, the composition may also comprise a polyisoprene (IR) rubber. The Mooney viscosity of the polyisoprene rubber as measured at 100° C. (ML 1+4, ASTM D1646) may range from 35 to 90, or from 40 to about 90, or in another embodiment from 45 to 90.

In yet another embodiment, the composition may also comprise rubbers of ethylene and propylene derived units such as ethylene-propylene rubber ("EP") and ethylene-propylene-diene rubber ("EPDM"), and their mixtures. Examples of suitable comonomers in making EPDM are ethylidene norbornene, 1,4-hexadiene, dicyclopentadiene, as well as others. These rubbers are described in RUBBER TECHNOLOGY 260-283 (1995). A suitable ethylene-propylene rubber is commercially available as VISTALON (ExxonMobil Chemical Company, Houston, Tex.).

Hydrocarbon Polymer Additives ("HPAs")

As used herein, the term "hydrocarbon polymer additives" (HPAs) may be used interchangeably with the term "hydrocarbon resins".

Suitable HPAs include hydrocarbon resins, examples of which include, but are not limited to aliphatic hydrocarbon resins, hydrogenated aliphatic hydrocarbon resins, aromatic hydrocarbon resins, hydrogenated aromatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, coumarone indene resins, polyterpene resins, modified terpene resins, terpene-phenol resins, rosins, rosin esters, resins grafted with an unsaturated acid or anhydride, and mixtures of any two or more thereof. All HPA component percentages listed herein are mole %, unless otherwise noted. Substantially free of a hydrocarbon polymer additive component is defined to mean that the hydrocarbon polymer additive comprises less than 0.5 mol % of the component, or more preferably less than 0.25 mol % of the component, or most preferably less than 0.1 mol % of the component.

The compositions disclosed herein further include HPAs in amounts between about 1 to about 90 phr, preferably from about 2 to about 90 phr, more preferably from about 4 to about 80 phr, more preferably from about 5 to about 80 phr, more preferably from about 5 to about 70 phr, more preferably about 5 to about 65, more preferably about 5 to about 60, more preferably about 5 to about 55, more preferably from about 5 to about 50 phr, wherein a preferred range of resin may be any upper phr limit combined with any lower phr limit described herein. The resin used in the composition may comprise a mixture of two or more hydrocarbon resins as described below.

A combination of HPAs, i.e. at least one first hydrocarbon polymer additive and at least one second hydrocarbon polymer additive, is included in the inventive elastomeric compositions. In one embodiment, each of the first hydrocarbon polymer additive and the second hydrocarbon polymer additive is selected from the group consisting of: $C_5$ aliphatic resins, $C_9$ aromatic resins, mixed $C_5/C_9$ resins, aromatic pure monomer resins, dicyclopentadiene (DCPD) resins, aromatic modified cycloaliphatic resins, coumarone indene resins, rosin resins, terpene resins, modified terpene resins, terpene phenolic resins, and hydrogenated resins thereof. Exemplary pairs of the first HPA and second HPA are: $C_5$ aliphatic resin/$C_9$ aromatic resin, mixed $C_5/C_9$ resin/ pure aromatic monomer resin, and $C_5$ aliphatic resin/hydrogenated DCPD resin, $C_5$ aliphatic resin/hydrogenated aromatic modified DCPD resin, hydrogenated DCPD resin/pure monomer resin, terpene resin/pure monomer resin, terpene resin/hydrogenated aromatic modified DCPD resin, $C_5$ aliphatic resin/terpene phenolic resin, hydrogenated DCPD/ terpene phenolic resin, terpene resin/rosin resin, $C_5$ aliphatic resin/rosin resin, etc.

When referring to hydrogenated resins, hydrogenated includes resins that are at least partially hydrogenated and substantially hydrogenated. As used herein at least partially hydrogenated means that the material contains less than 90% olefinic protons, more preferably less than 75% olefinic protons, more preferably less than 50% olefinic protons, more preferably less than 40% olefinic protons, more preferably less than 25% olefinic protons, more preferably less than 15% olefinic protons, more preferably less than 10% olefinic protons, more preferably less than 9% olefinic protons, more preferably less than 8% olefinic protons, more preferably less than 7% olefinic protons, and more preferably less than 6% olefinic protons. As used herein, substantially hydrogenated means that the resin contains less than 5% olefinic protons, more preferably less than 4% olefinic protons, more preferably less than 3% olefinic protons, more preferably less than 2% olefinic protons, more preferably less than 1% olefinic protons, more preferably less than 0.5% olefinic protons, more preferably less than 0.1% olefinic protons, and more preferably less than 0.05% olefinic protons after hydrogenation. Substantially hydrogenated resins may also include resins that have had at least a portion, more preferably at least 90%, more preferably at least 95%, more preferably at least 96%, more preferably at least 97%, more preferably at least 98%, and more preferably at least 99% of the aromatics hydrogenated as well.

In an embodiment, each of the first and second HPAs preferably has a glass transition temperature (Tg) below 120° C., more preferably below 118° C., more preferably below 116° C., more preferably below 115° C., more preferably below 112° C., more preferably below 110° C., more preferably below 109° C., more preferably below 108° C., more preferably below 107° C., more preferably below 106° C., and more preferably below 105° C. Suitable hydrocarbon resins also have a Tg preferably above −50° C., preferably above −40° C., preferably above −39° C., preferably above −38° C., preferably above −36° C., preferably above −35° C., preferably above −34° C., preferably above −33° C., preferably above −32° C., preferably above −31° C. In one embodiment, the hydrocarbon resin preferably has a Tg between −50° C. to 120° C., more preferably −45° C. to 110° C., more preferably −40° C. to 105° C., more preferably −35° C. to 100° C., wherein a preferred range of Tg may be any upper temperature limit combined with any lower temperature limit described herein.

The glass transition (Tg) is measured by the test method described herein. 8(+/−1 mg) of the sample was weighed and introduced in an aluminum pan. A cover was placed on the pan and sealed with a press. The sample was conditioned by two heating and one cooling cycle as described. The sample was heated from 25° C. to 80° C. at a rate of 20° C./min followed by a 1 min hold at 80° C. (first heating cycle). The sample was cooled from 80° C. to −100° C. at a rate of 10° C./min followed by 5 minute hold at −100° C. (first cooling cycle). The Tg of resin is measured by again heating the sample from −100° C. to 80° C. at a rate of 20° C./min (second heating cycle). The glass transition temperature reported is the midpoint of step change when heated during the second heating cycle.

In an embodiment, each of the first and second HPAs preferably has a softening point below 160° C., more preferably below 155° C., more preferably below 150° C., more preferably below 149° C., more preferably below 148° C., and more preferably below 147° C. Suitable hydrocarbon resin also have a softening point above 0° C., more preferably between 0° C. to 160° C., more preferably 5° C. to 155° C., more preferably 10° C. to 155° C., and more preferably 15° C. to 150° C., wherein a preferred range of softening point may be any upper temperature limit combined with any lower temperature limit described herein. Softening point (° C.) can be estimated based on the glass transition temperature (Tg) and is approximately 50° C. above the Tg. Alternatively, Softening Point can be measured as a ring and ball softening point according to ASTM E-28 (Revision 1996), with a heating and cooling rate of 10° C./min.

Suitable $C_5$ aliphatic hydrocarbon resins include ESCOREZ™ 1102, ESCOREZ™ 1310 and EMPR™ 118 available from ExxonMobil Chemical Company, Houston, Tex., PICCOTAC™ 1020,1020 E, 7050, and 9095 available from Eastman Chemical Company, Kingsport, Tenn., WINGTACK™ 10,95 and 98 available from Cray Valley Total, and QUINTONE™ K100, R100, and A100 available from Nippon Zeon of Japan.

Suitable $C_9$ aromatic and hydrogenated aromatic resins include NP-10, NP-25, Nevchem® 200, and Nevchem® 220 available from Neville Chemical Company, ARKON™ M-90 (partially hydrogenated), P-90 (fully hydrogenated), and P-140 available from Arakawa Chemical Co. of Japan, Picco 2100, Picco 5140, Plastolyn 240, Plastolyn 290, and REGALREZ™ 1018,1085, 1094, and 1139, available from Eastman Chemical.

Suitable mixed $C_5/C_9$ resins include Oppera™ PR373, and ESCOREZ™ 2203 LC available from ExxonMobil Chemical Company, Houston, Tex., PICCOTAC™ 8095 available from Eastman, WINGTACK™ ET available from Cray Valley, and QUINTONE™ D100, N180, P195N, and U190 available from Nippon Zeon. Suitable hydrogenated mixed $C_5/C_9$ resins include REGALITE™ R1090, and R1125 available from Eastman.

Suitable pure aromatic resins include Cleartack® W-85, and Cleartack® W-140 available from Cray Valley of France; Kristalex 3070, Kristalex 1120, Endex 155, and Endex 160 from Eastman Chemical Company; Sylvares™ SA85, SA100, SA115, SA120, and SA140 from Kraton Corporation.

Suitable hydrogenated cycloaliphatic/aromatic hydrocarbon resins include ESCOREZ™ 5600, 5615, and 5690 available from ExxonMobil Chemical Company, Houston, Tex.

Suitable terpene resins include SYLVAGUM™ TR 105 and TR 90, SYLVARES™ TR 7115, TR 7125, and TR A25L available from Kraton Corporation, CLEARON P85 (hydrogenated), available from Yashura Chemical Company, DERCOLYTE™ LTG, Dercolyte A115, A125, S115, and S125, available from DRT Chemical Company of Landes, France.

In one embodiment, the first HPA of the inventive elastomeric composition is a mixed $C_5/C_9$ resin comprising from 60% to 90% piperylene, from 5% to 15% cyclic components, and from 1% to 20% styrenic components. The HPA may optionally comprise up to 5% isoprene, up to 10% amylene, and up to 5% indenic components. The first HPA is present in amounts of 5 to 50 phr, preferably 10 to 40 phr, more preferably 15 to 30 phr, based on total weight of the inventive elastomeric composition.

In another embodiment, the first hydrocarbon polymer additive is a mixed $C_5/C_9$ resin having a number average molecular weight Mn of from, 200 g/mole to 3500 g/mole, 250 g/mole to 3000 g/mole, 260 g/mole to 2800 g/mole, or 280 g/mole to 2600 g/mole, as determined by GPC. In another embodiment, the second hydrocarbon polymer additive is a pure aromatic monomer resin having a number average molecular weight Mn of from, 200 g/mole to 3500 g/mole, 250 g/mole to 3000 g/mole, 260 g/mole to 2800 g/mole, or 270 g/mole to 2700 g/mole, or 280 g/mole to 2600 g/mole.

Mw, Mn, and MWD (Mw/Mn) was measured by the GPC test method described herein. The molecular weight was measured using Tosoh EcoSEC HLC-8320GPC instrument with enclosed Refractive Index (RI) Ultraviolet and (UV) detectors. The instrument was controlled and molecular weight was calculated using EcoSEC Workstation (Version 1.11) software. 4 columns (PLgel 5 μm 500Å; 5 μm 500Å; 5 μm 10E3Å; 5 μm Mixed-D) were connected in series for effective separation. A sample was prepared by dissolving 24 mg (+/−1 mg) of hydrocarbon resin in 9 mL of tetrahydrofuran (THF) solution. The sulfur/THF solution (having a ratio of 1 mL sulfur solution per 100 mL THF solvent) was used as flow marker, for measurement of molecular weight. The dissolved sample was filtered using 0.45 mm syringe filter. The GPC calibration was done using a series of selected polystyrene standards that are of narrow molecular weights and cover the molecular weight range of the columns respective range of separation.

The combination of HPAs can be judicially chosen for use in elastomeric compositions so that the composition's bulk viscoelasticity, filler distribution and dispersion in different phases of the immiscible blend of elastomers can be tuned for desired tire performance characteristics. Therefore, the present invention also provides a use of the combination of hydrocarbon polymer additives in adjusting properties of elastomeric compounds.

Production of HPAs

Hydrocarbon resins are well known and are produced, for example, by Friedel-Crafts polymerization of various feeds, which may be pure monomer feeds or refinery streams containing mixtures of various unsaturated materials.

Generally speaking, the purer the feed the easier to polymerize. For example, pure styrene, pure α-methyl styrene and mixtures thereof are easier to polymerize than a $C_8/C_9$ refinery stream. Similarly, pure or concentrated piperylene is easier to polymerize than $C_4$-$C_6$ refinery streams. These pure monomers are, however, more expensive to produce than the refinery streams which are often by-products of large volume refinery processes.

For example, aliphatic hydrocarbon resins can be prepared by cationic polymerization of a cracked petroleum feed containing $C_4$, $C_5$, and $C_6$ paraffins, olefins, and conjugated diolefins referred to herein as $C_5$ monomers. As used herein, $C_5$ monomers preferably excludes DCPD monomer removed by thermal soaking as described below. These monomer streams comprise cationically and thermally polymerizable monomers such as butadiene, isobutylene, 1,3-pentadiene (piperylene) along with 1,4-pentadiene, cyclopentene, 1-pentene, 2-pentene, 2-methyl-1-pentene, 2-methyl-2-butene, 2-methyl-2-pentene, isoprene, cylcohexene, 1-3-hexadiene, 1-4-hexadiene, cyclopentadiene, and dicyclopentadiene. To obtain these $C_5$ monomer feeds the refinery streams are preferably purified usually by both fractionation and treatment to remove impurities. In some embodiments, the $C_5$ monomer feed stream may include at least some cyclopentadiene (CPD) and substituted cyclopentadiene (e.g., methylcyclopentadiene) components. These components are optionally separated from the $C_5$ monomer streams by thermal soaking wherein the $C_5$ monomer feed stream is heated to a temperature between 100° C. and 150° C. for 0.5 to 6 hours followed by separation of the DCPD monomers, to reduce the level of cyclopentadiene or dicyclopentadiene in the $C_5$ monomer stream to preferably below 2 wt %. Low temperature heat soaking is preferred in order to limit the cyclic diene (cyclopentadiene and methylcyclopentadiene) co-dimerization with $C_5$ linear conjugated dienes (isoprene and pentadienes 1,3 cis- and trans-). The thermal soaking step preferably dimerizes the cyclopentadiene and substituted cyclopentadiene, making separation from the $C_5$ monomer stream easier. After fractionation, and if carried out, thermal soaking, the feedstock is preferably subjected to distillation to remove cyclic conjugated diolefins which are gel precursors (cyclopentadiene and methylcyclopentadiene being removed as dimers, trimers, etc.).

The resin polymerization feed may also comprise $C_9$-$C_{10}$ aromatic monomers (referred to herein as $C_9$ monomers) such as styrene, indene, derivatives of styrene, derivatives of indene, and combinations thereof.

Particularly preferred aromatic olefins include styrene, α-methylstyrene, p-methylstyrene, indene, methylindenes and vinyl toluenes. One example of a $C_9$ monomer stream is a steam cracked petroleum stream boiling in the range of −10° C. to 210° C. (135° C. to 210° C. if the $C_5$ monomers and DCPD components are not present). Examples of commercial $C_9$ monomer feedstocks include LRO-90 from Lyondell Petrochemical Company, Houston, Tex., DSM $C_9$ Resinfeed Classic from DSM, Geleen, the Netherlands, RO-60 and RO-80 from Dow Chemical Company of Midland, Mich., and Dow Resin Oil 60-L from the Dow Chemical Company of Terneuzen, the Netherlands.

In addition to the reactive components, non-polymerizable components in the feed may include saturated hydrocarbons such as pentane, cyclopentane, or 2-methyl pentane that can be co-distilled with the unsaturated components. This monomer feed can be co-polymerized with other $C_4$ or $C_5$ olefins or dimers.

Preferably, however, the feeds are purified to remove unsaturated materials that adversely affect the polymerization reaction or cause undesirable colors in the final resin (e.g., isoprene). This is generally accomplished by fractionation. In one embodiment, polymerization is conducted using Friedel-Crafts polymerization catalysts such as supported or unsupported Lewis acids (e.g., boron trifluoride ($BF_3$), complexes of boron trifluoride, aluminum trichloride ($AlCl_3$), complexes of aluminum trichloride or alkyl aluminum halides, particularly chlorides). Suitable reaction conditions for Friedel-Crafts polymerization include temperatures of −20° C. to 100° C., pressures of 100 to 2000 kPa. $C_5$ and $C_9$ monomers may be polymerized by such a process.

Typically, the feed stream includes between 20 to 80 wt % monomers and 20-80 wt % solvent. Preferably, the feed stream includes 30 to 70 wt % monomers and 30-70 wt % of solvent. More preferably, the feed stream includes 50 to 70 wt % monomers and 30 to 50 wt % of solvent. The solvent may include an aromatic solvent, which may be toluenes, xylenes, other aromatic solvents, aliphatic solvents and/or mixtures of two or more thereof. The solvent is preferably recycled. The solvent may comprise the unpolymerizable component of the feed.

The solvents generally contain less than 250 ppm water, preferably less than 100 ppm water, and most preferably less than 50 ppm water.

The feed stream may include 30 to 95 wt % of $C_5$ monomers, as described above and 5 to 70 wt % of a co-feed including at least one member selected from the group consisting of pure monomer, $C_9$ monomers, and terpenes. Preferably, the feed stream includes about 50 to 85 wt % of $C_5$ monomers and about 15 to 50 wt % of a co-feed.

The monomer feed can be co-polymerized with $C_4$ or $C_5$ olefins or their olefinic dimers as chain transfer agents. Up to 40 wt %, preferably up to 20 wt %, of chain transfer agents may be added to obtain resins with lower and narrower molecular weight distributions than can be prepared from using the monomer feed alone. Chain transfer agents stop the propagation of a growing polymer chain by terminating the chain in a way, which regenerates a polymer initiation site. Components, which behave as chain transfer agents in these reactions include but are not limited to, 2-methyl-1-butene, 2-methyl-2-butene or dimers or oligomers of these species. The chain transfer agent can be added to the reaction in pure form or diluted in a solvent.

A DCPD resin and/or oligomers thereof (referred to also as CPD oligomers) may be obtained by thermal polymerization of a feed comprising unsaturated monomers of DCPD and/or substituted DCPD. The feed may also comprise aromatic monomers as previously described. Generally, a mixture of (a) DCPD stream, preferably a steam cracked petroleum distillate boiling in the range 80° C. to 200° C., more preferably 140° C. to 200° C., containing dimers and codimers of cyclopentadiene and its methyl derivatives together with (b) $C_9$ monomers, preferably a steam cracked distillate boiling in the range 150° C. to 200° C. comprising α-methyl styrene, vinyl toluenes, indene and methyl indene with other $C_9$ and $C_{10}$ aromatics, in the weight ratio (a:b) between 90:10 to 50:50 is heated in a batch polymerization reactor to 160° C. to 320° C. at a pressure of 980 kPa to 2000 kPa (more preferably $9.8 \times 10^5$-$11.7 \times 10^5$ Pa), for 1.2 to 4 hours, more preferably 1.5 to 4 hrs. Where inclusion of the oligomers is not desired, the resulting polymerizate may steam stripped to remove inert, unreacted, and low molecular weight oligomeric components to yield a resin having a softening point in the range 80° C. to 120° C.

The resins may also be obtained by or derived from thermal polymerization of a feed comprising $C_5$ monomers and $C_9$ monomers as previously described. In such embodiments, a mixture of (a) $C_5$ monomers, preferably, a steam cracked petroleum distillate boiling in the range 80° C. to 200° C. containing $C_5$ monomers together with (b) $C_9$ monomers, preferably a steam cracked distillate boiling in the range 150° C. to 200° C. comprising α-methyl styrene, vinyl toluenes, indene and methyl indene with other $C_8$-$C_{10}$ aromatics, in the weight ratio (a:b) between 90:10 to 50:50 is heated in a batch polymerization reactor to 160° C. to 320° C. at a pressure of 980 kPa to 2000 kPa (more preferably $9.8 \times 10^5$-$11.7 \times 10^5$ Pa), for 1.2 to 4 hours, more preferably 1.5 to 4 hrs. Where inclusion of the oligomers is not desired, the resulting polymerizate may be steam stripped to remove inert, unreacted, and low molecular weight oligomeric components to yield a resin having a softening point in the range 80° C. to 120° C.

The products of the polymerization process include both resin and an oligomer by-product comprising oligomers (dimers, trimers, tetramers, pentamers, and hexamers, and optionally septamers and octamers) of the feed monomer (s). As used hereafter, resin material refers to the resin, the oligomers, or a mixture of the two. Where the oligomer by-product results from thermal polymerization of DCPD and substituted DCPD, the oligomers are typically a complex mixture of (preferably hydrogenated as described below) Diels Alder trimers and tetramers of CPD and methyl-CPD with low levels of acyclic $C_5$ diolefins such as pentadiene-1,3 and isoprene.

The resin material is then preferably hydrogenated to reduce coloration and improve color stability. Any of the known processes for catalytically hydrogenating resin material can be used. In particular the processes disclosed in U.S. Pat. Nos. 5,171,793, 4,629,766, 5,502,104, 4,328,090 and International Application No. WO 95/12623 are suitable. Generic hydrogenation treating conditions include reactions in the temperature range of about 100° C. to 350° C. and pressures of between 5 atm (506 kPa) and 300 atm (30390 kPa) hydrogen (and even up to 400 atm hydrogen), for example, 10 to 275 atm (1013-27579 kPa). In one embodiment the temperature is in the range including 180° C. to 330° C. and the pressure is in the range including 15195 to 20260 kPa hydrogen. The hydrogen to feed volume ratio to the reactor under standard conditions (25° C., 101 kPa pressure) typically can range from 20:1-200:1; for water-white resins 100:1-200:1 is preferred. The hydrogenated product may be stripped to remove low molecular weight by-products and any solvent. This oligomeric by-product is a low-viscosity nearly colorless liquid boiling between 250° C. and 400° C. and is preferably substantially hydrogenated.

The hydrogenation of the resin material may be carried out via molten or solution based processes by either a batch wise or, more commonly, a continuous process. Catalysts employed for the hydrogenation of hydrocarbon resins are typically supported monometallic and bimetallic catalyst systems based on group 6, 8, 9, 10 or 11 elements. Catalysts such as nickel on a support (for example, nickel on alumina, nickel on charcoal, nickel on silica, nickel on kieselguhr, etc.), palladium on a support (for example, palladium on silica, palladium on charcoal, palladium on magnesium oxide, etc.) and copper and/or zinc on a support (for example copper chromite on copper and/or manganese oxide, copper and zinc on alumina, etc.) are good hydrogenation catalysts.

The support material is typically comprised of such porous inorganic refractory oxides as silica, magnesia, silica-magnesia, zirconia, silica-zirconia, titania, silica-titania, alumina, silica-alumina, alumina-silicate, etc., with supports containing-alumina being highly preferred. Preferably, the supports are essentially free of crystalline molecular sieve materials. Mixtures of the foregoing oxides are also contemplated, especially when prepared as homogeneously as possible. Useful support materials include those disclosed in the U.S. Pat. Nos. 4,686,030, 4,846,961, 4,500,424, and 4,849,093. Suitable supports include alumina, silica, carbon, MgO, $TiO_2$, $ZrO_2$, $Fe_2O_3$ or mixtures thereof.

Another suitable process for hydrogenating the resin material is described in EP Patent No. 0082726. EP 0082726 describes a process for the catalytic or thermal hydrogenation using a nickel-tungsten catalyst on a gamma-alumina support wherein the hydrogen pressure is $1.47 \times 10^7$-$1.96 \times 10^7$ Pa and the temperature is in the range of 250° C. to 330° C. After hydrogenation the reactor mixture may be flashed and further separated to recover hydrogenated resin material. In one embodiment, steam distillation may be used to separate the oligomers and is preferably conducted without exceeding 325° C. resin temperature.

The catalyst may comprise nickel and/or cobalt with one or more of molybdenum and/or tungsten on one or more of alumina or silica supports wherein the amount of nickel oxide and/or cobalt oxide on the support ranges from 2 to 10 wt %. The amount of tungsten or molybdenum oxide on the support after preparation ranges from 5 to 25 wt %. Preferably, the catalyst contains 4 to 7 wt % nickel oxide and 18 to 22 wt % tungsten oxide. This process and suitable catalysts are described in greater detail in U.S. Pat. No. 5,820,749. In another embodiment, the hydrogenation may be carried out using the process and catalysts described in U.S. Pat. No. 4,629,766. In particular, nickel-tungsten catalysts on gamma-alumina are preferred.

The oligomers may be stripped from the resin before hydrogenation and are preferably hydrogenated before grafting. The oligomers may also be hydrogenated with the resin and then stripped from the resin, yielding a hydrogenated resin and hydrogenated oligomers. At least some of the oligomers may be stripped before hydrogenation and at least some hydrogenated oligomers may be stripped after hydrogenation. The hydrogenated resin/oligomers product may be further processed together as a single mixture as described below. The oligomers may also be derived from any suitable source and hydrogenated (if necessary) before grafting so that the oligomers before grafting are typically at least partially hydrogenated and preferably substantially hydrogenated.

Fillers and Additives

The inventive compositions typically contain some fillers and additives customarily used in rubber compounds, such as effective amounts of processing aids including rubber processing oils, pigments, accelerators, cross-linking and curing materials, antioxidants, antiozonants, fillers, and/or clays.

The filler components can be selected from calcium carbonate, clay, mica, silica, silicates, talc, aluminum hydroxide, aluminum oxide, titanium dioxide, silicon nitride, silicon carbide, starch and other organic fillers such as wood flour, carbon black, carbon-silica dual phase filler, and mixtures thereof. The fillers may be any size and typically range, for example in the tire industry, from about 0.0001 μm to about 100 μm.

As used herein, silica is meant to refer to any type or particle size silica or another silicic acid derivative, or silicic acid, processed by solution, pyrogenic, or the like methods, including untreated or surface treated, precipitated silica, crystalline silica, colloidal silica, aluminum or calcium silicates, fumed silica, and the like. Precipitated silica can be conventional silica, semi-highly dispersible silica, or highly dispersible silica.

The clay may be, for example, montmorillonite, nontronite, beidellite, vokoskoite, laponite, hectorite, saponite, sauconite, magadite, kenyaite, stevensite, vermiculite, halloysite, aluminate oxides, hydrotalcite, or mixtures thereof, optionally, treated with modifying agents. The clay may contain at least one silicate. Alternatively, the filler may be a layered clay, optionally, treated or pre-treated with a modifying agent such as organic molecules; the layered clay may comprise at least one silicate.

The silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which includes saponite, hectorite, and sauconite. Also encompassed are synthetically prepared smectite-clays.

The silicate may comprise natural or synthetic phyllosilicates, such as montmorillonite, nontronite, beidellite, bentonite, volkonskoite, laponite, hectorite, saponite, sauconite, magadite, kenyaite, stevensite, and the like, as well as vermiculite, halloysite, aluminate oxides, hydrotalcite, and the like. Combinations of any of the above discussed silicates are also contemplated.

The layered filler such as the layered clays described above may be modified such as intercalated or exfoliated by treatment with at least one modifying agent. Modifying agents are also known as swelling or exfoliating agents. Generally, they are additives capable of undergoing ion exchange reactions with the cations present at the interlayer surfaces of the layered filler. The modifying agent may be added as an additive to the composition at any stage; for example, the additive may be added to the elastomer, followed by addition of the layered filler, or may be added to a combination of at least one elastomer and at least one layered filler; or the additive may be first blended with the layered filler, followed by addition of the elastomer in yet another embodiment.

In one embodiment, one or more silane coupling agents are used in the elastomeric compositions. Coupling agents are particularly desirable when silica is the primary filler, or is present in combination with another filler, as they help bind the silica to the elastomer. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-aminopropyl triethoxysilane, gamma-mercaptopropyltrimethoxysilane, and the like, and mixtures thereof.

The fillers may be carbon black or modified carbon black. The filler may also be a blend of carbon black and silica. In one embodiment, the elastomeric composition is a tire tread or sidewall and comprises reinforcing grade carbon black at a level of from 10 to 120 phr of the blend, more preferably from 30 to 100 phr in another embodiment, and in yet another embodiment from 40 to 90 phr. Useful grades of carbon black include the ranges of from N110 to N990.

Crosslinking Agents, Curatives, Cure Packages, and Curing Processes

The compositions and the articles made therefrom are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry.

Generally, polymer blends are crosslinked to improve the polymer's mechanical properties. Physical properties, performance characteristics, and durability of vulcanized rubber compounds are known to be related to the number (crosslink density) and type of crosslinks formed during the vulcanization reaction. Polymer blends may be crosslinked by adding curative agents, for example sulfur, metals, metal oxides such as zinc oxide, peroxides, organometallic compounds, radical initiators, fatty acids, and other agents common in the art. Other known methods of curing that may be used include, peroxide cure systems, resin cure systems, and heat or radiation-induced crosslinking of polymers. Accelerators, activators, and retarders may also be used in the curing process.

The compositions may be vulcanized (also referred to as "cured") by any suitable means, such as subjecting them to heat or radiation according to any conventional vulcanization process. The amount of heat or radiation needed is that which is required to affect a cure in the composition, and the invention is not herein limited by the method and amount of heat required to cure the composition. Typically, the vulcanization is conducted at a temperature ranging from about 100° C. to about 250° C. in one embodiment, from 120° C. to 200° C. in another embodiment, for about 1 to 150 minutes.

Halogen-containing elastomers may be crosslinked by their reaction with metal oxides. Examples of useful metal oxides include, but are not limited to, ZnO, CaO, and PbO. The metal oxide can be used alone or in conjunction with its corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof.

Sulfur is the most common chemical vulcanizing agent for diene-containing elastomers. The sulfur vulcanization system may consist of an activator to activate the sulfur, an accelerator, and a retarder to help control the rate of vulcanization.

Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Accelerators help control the onset of and rate of vulcanization, and the number and type of crosslinks that are formed. Retarders may be used to delay the initial onset of cure in order to allow sufficient time to process the unvulcanized rubber.

The acceleration of the vulcanization process may be controlled by regulating the amount of the acceleration accelerant, often an organic compound. The mechanism for accelerated vulcanization of natural rubber, BR, and SBR involves complex interactions between the curative, accelerator, activators, and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), benzothiazyl disulfide (MBTS), N-tertiarybutyl-2-benzothiazole sulfenamide (TBBS), N-cyclohexyl-2-benzothiazole-sulfenamide (CBS), and thioureas.

In one embodiment of the invention, at least one curing agent(s) is present from 0.2 to 10 phr, or from 0.5 to 8 phr, or in another embodiment from 0.75 phr to 6 phr.

Processing Method of Compositions

The inventive compositions may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage which is conventionally called the "productive" mix stage. In the productive mix stage the mixing typically occurs at a temperature, or ultimate temperature, lower than the mix temperature(s) of the preceding non-productive mix stage(s). The elastomers, polymer additives, silica and silica coupler, and carbon black, if used, are generally mixed in one or more non-productive mix stages. The terms "non-productive" and "productive" mix stages are well known to those having skill in the rubber mixing art.

In one embodiment, the carbon black is added in a different stage from zinc oxide and other cure activators and accelerators. In another embodiment, antioxidants, antiozonants, and processing materials are added in a stage after the carbon black has been processed with the elastomers, and zinc oxide is added at a final stage to maximize the compound modulus. In a further embodiment, mixing with the clays is performed by techniques known to those skilled in the art, wherein the clay is added to the polymer at the same time as the carbon black. In other embodiments, additional stages may involve incremental additions of one or more fillers.

In another embodiment, mixing of the components may be carried out by combining the elastomer components, filler and clay in any suitable mixing device such as a two-roll open mill, Brabender™ internal mixer, Banbury™ internal mixer with tangential rotors, Krupp internal mixer with intermeshing rotors, or preferably a mixer/extruder, by techniques known in the art. Mixing may be performed at temperatures up to the melting point of the elastomer(s) used in the composition in one embodiment, or from 40° C. to 250° C. in another embodiment, or from 90° C. to 200° C. in yet another embodiment. Mixing should generally be conducted under conditions of shear sufficient to allow the clay to exfoliate and become uniformly dispersed within the elastomer(s).

Typically, from 70% to 100% of the elastomer or elastomers is first mixed for 20 to 90 seconds, or until the temperature reaches from 40° C. to 75° C. Then, approximately 75% of the filler, and the remaining amount of elastomer, if any, is typically added to the mixer, and mixing continues until the temperature reaches from 90° C. to 150° C. Next, the remaining filler is added, as well as the processing aids, and mixing continues until the temperature reaches from 140° C. to 190° C. The masterbatch mixture is then finished by sheeting on an open mill and allowed to cool, for example, to from 60° C. to 100° C. when curatives may be added.

Industrial Applicability

The compositions of the invention may be extruded, compression molded, blow molded, injection molded, and laminated into various shaped articles including fibers, films, laminates, layers, industrial parts such as automotive parts, appliance housings, consumer products, packaging, and the like.

In particular, the compositions are useful in articles for a variety of tire applications such as truck tires, bus tires, automobile tires, motorcycle tires, off-road tires, aircraft tires, and the like. Such tires can be built, shaped, molded, and cured by various methods which are known and will be readily apparent to those having skill in the art. The elastomeric compositions may either be fabricated into a finished article or a component of a finished article such as the tread for a tire. The article may be selected from sidewalls, treads, and the like.

The compositions of the present invention are useful in a variety of applications, particularly pneumatic tire components, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and bladders for fluid retention and curing processes.

The compositions may also be useful in molded rubber parts and may find wide applications in automobile suspension bumpers, auto exhaust hangers, and body mounts.

EXAMPLES

The compositions comprising at least one elastomer and a combination of hydrocarbon polymer additives will now be further described with reference to the following non-limiting examples.

Test Methods

Cure properties were measured using a Dynamic Mechanical Analyzer ATD 1000 from Alpha Technologies, Inc. at the indicated temperature, based on ASTMD5289. Test specimens were cured at the indicated temperature, typically from 140° C. to 170° C., for a time (in minutes) corresponding to $t_{90}$+2 including appropriate mold lag.

When possible, standard ASTM tests were used to determine the cured compound physical properties. Stress/strain properties (tensile strength, elongation at break, modulus values, energy to break) were measured at room temperature (RT)—about 23° C. using an Instron 4204 or an Instron Series IX Automated Materials Testing System 6.03.08. Tensile strength measurements were made at ambient temperature; For each composition, one tensile pad (3.0 inch by 6.0 inch, ~2.0 mm in thickness) was cured at 150° C. for $t_{90}$+2 min, here $t_{90}$ time was from the cure test for the corresponding compound.

Though the thickness of the test specimen was a nominal 2.00 mm, the thickness of the specimens varied and was measured manually by a Mitutoyo Digimatic Indicator connected to the system computer. The specimens were pulled at a crosshead speed of 2 inches/min (5.1 cm/min.) and the stress/strain data was recorded. The median stress/strain value of at least three specimens is reported.

Specimens were die-cut out from the tensile pad for each compound for both tensile testing at room temperature (RT=about 23° C.) and dynamic temperature ramp testing in a laboratory. The dynamic temperature ramp testing was at 10 Hz with a heating rate of 2° C./min. The strain amplitude was at 0.20% for temperature below −10° C., and it was raised to 2.0% for temperature at and above −10° C. The testing geometry adopted was torsion rectangular. Micro-dumbbell specimens were employed for the tensile testing at RT (about 23° C.). For most compounds, five specimens were tested for each compound. The values for mod 100%, mod 300%, tensile at break and elongation at break listed in the tables below were the median values for each quantity of a compound.

The values "MH" and "ML" used herein refer to "maximum torque" and "minimum torque", respectively. The values of "$t_{90}$" are cure times in minutes.

Dynamic properties (G*, G', G", and tan delta) were determined using an Advanced Rheometric Expansion System (ARES) from Rheometric Scientific, Inc. Values of G" or tan delta measured at 0° C. in laboratory dynamic testing can be used as predictors of wet traction performance of tread compounds. Dynamic tan delta values at 60° C. can be used as an indicator of the tire tread compound's contribution to rolling resistance. The complex modulus value (G*) measured at 60° C. is used as a lab predictor of the dry handling, or cornering coefficient, characteristics of the tread component on the tire. A higher value is needed when a higher speed rated tire (i.e., H-, V-, Z-rated) is desirable.

Other test methods are listed in Table 1.

TABLE 1

| Test Methods | | |
|---|---|---|
| Parameter | Units | Test |
| Rotorless cure meter @ 150° C., | | |
| ML | deciNewton · meter | ASTM D5289 |
| MH | dNewton · m | |
| $t_{90}$ | minutes | |
| Physical Properties, press cured $t_{90}$ + 2 min @ 150° C. | | |
| Modulus 100%, 300% | MPa | ASTM D412 |
| Tensile Strength | MPa | |
| Elongation at Break | % | |

Typical physical and chemical properties of hydrocarbon polymer additives used in the examples are listed in Table 2. Estimated Softening Point for the three hydrocarbon polymer additives of Table 2 are reported based on the correlation that the Softening Point is about 50° C. above the glass transition temperature (Tg) of the hydrocarbon polymer additives.

TABLE 2

| Parameters and Properties of Exemplary HPAs | | | | | |
|---|---|---|---|---|---|
| | Mn (g/mole) | Mw (g/mole) | PDI | Tg (° C.) | Estimated Softening Point (° C.) |
| HPA 1-1 Oppera ™ PR140 | 343 | 617 | 1.8 | 54 | ~103 |
| HPA 1-2 Escorez ™ 1102 | 1169 | 2672 | 2.3 | 53 | ~100 |
| HPA 2 Cleartak W-100 | 769 | 1384 | 1.8 | 56 | 95-105 |

A listing of various components used in the inventive compositions of the examples is in Table 3.

TABLE 3

Various Components in the Compositions

| Material | Brief Description | Source | Commercial Name |
|---|---|---|---|
| Natural Rubber | Elastomer | Various sources | SMR 20 |
| Polybutadiene | Neodymium BR | Firestone Polymers | Diene 140ND |
| N121 | Carbon black | Sid Richardson | — |
| 6PPD | Antiozonant; N-(1,3-dimethylbutyl)-N'-phenyl-p-phenylenediamine | Eastman Chemical | Santoflex ™ 6PPD |
| Agerite resin D | Antioxidant; Polymerized 1,2-dihydro-2,2,4-trimethylquinoline | Vanderbilt Chemicals | Agerite ® resin D |
| Wax | Antiozonant; wax blend | Addivant | Sunproof ® Improved |
| Oil | Heavy black naphthenic rubber processing oil | Nynas AB | Nytex 4700 |
| ZnO | Activator; Zinc Oxide | Zinc Corp of America | Kadox 9111 |
| Stearic Acid | Activator | Witco Manufacturing | ACI 5106NF |
| OBTS | Accelerator; N-oxydiethylenebenzothiazole-2-sulfenamide | Vanderbilt Chemicals | AMAX ®-N |
| TBBS | Accelerator; N-tert-butyl-2-benzothiazole sulfenamide | Vanderbilt Chemicals | VANAX ® NS |
| Sulfur | Crosslinking agent | R. E. Carroll | Rubermakers Sulfur |
| HPA 1-1 | hydrocarbon polymer additive | ExxonMobil Chemical Company | Oppera ™ PR140 |
| HPA 1-2 | hydrocarbon polymer additive | ExxonMobil Chemical Company | Escorez ™ 1102 |
| HPA 2 | hydrocarbon polymer additive | Cray Valley | Cleartak W-100 (Formerly Norsolene W-100) |

Example 1

In example 1, a total of six elastomeric compositions comprising a first elastomer NR were mixed with a Banbury® mixer and then cured at 150° C. The formulations are shown in Table 4. Compounds 1-3, 1-4 and 1-5 are inventive examples comprising two different HPAs, i.e. HPA1-1 (Oppera™ PR140) and HPA1-2 (Escorez™ 1102), and other compositions are comparative examples. Curing properties of the compositions are listed in Table 4 as well.

It can be seen from Table 4 that a combination of two different HPAs in a single rubber composition, especially at high loading level of the HPAs, can be utilized for tuning material properties for tire applications. If the HPAs are compatible with the matrix elastomer, usage of such HPAs with different molecular shapes may further maximize their loading amount.

TABLE 4

Formulation of an Exemplary Composition Comprising NR

| | Formulation (in phr) | | | | | |
|---|---|---|---|---|---|---|
| | 1-1 | 1-2 | 1-3 | 1-4 | 1-5 | 1-6 |
| NR (SMR20) | 100 | 100 | 100 | 100 | 100 | 100 |
| Carbon black N121 | 55 | 55 | 55 | 55 | 55 | 55 |
| Zinc oxide | 4.0 | 4.0 | 4.0 | 4.0 | 4.0 | 4.0 |
| Stearic acid | 2.0 | 2.0 | 2.0 | 2.0 | 2.0 | 2.0 |
| Antiozonant 6PPD | 2.0 | 2.0 | 2.0 | 2.0 | 2.0 | 2.0 |
| Agerite resin D | 2.0 | 2.0 | 2.0 | 2.0 | 2.0 | 2.0 |
| Wax Sunproof Improved | 1.0 | 1.0 | 1.0 | 1.0 | 1.0 | 1.0 |
| Oil Nytex 4700 | 18 | 0 | 0 | 0 | 0 | 0 |
| Resin Excorez 1102 | 0 | 18 | 12 | 9 | 6 | 0 |
| Resin Oppera PR 140 | 0 | 0 | 6 | 9 | 12 | 18 |
| OBTS | 1.2 | 1.2 | 1.2 | 1.2 | 1.2 | 1.2 |
| Sulfur | 1.20 | 1.20 | 1.20 | 1.20 | 1.20 | 1.20 |
| Total | 186.4 | 186.4 | 186.4 | 186.4 | 186.4 | 186.4 |
| Cure test at 150° C. for 30 min | | | | | | |
| MH-ML (dNm) | 12.19 | 11.32 | 11.5 | 11.89 | 11.89 | 12.17 |
| $t_{90}$ (min) | 10.78 | 9.91 | 11.06 | 11.08 | 11.57 | 12.01 |

Example 2

In example 2, a total of eight elastomeric compositions comprising a blend of NR (SMR 20) and BR (Diene 140ND) in a weight ratio of 60:40 were mixed with a Brabender mixer and then cured at 150° C. The formulations are shown in Table 5. Compositions 2-3, 2-6 and 2-7 are inventive examples comprising two different HPAs, i.e. HPA1-2 (Escorez™ 1102) and HPA2-1 (Cleartak W-100), and other compositions are comparative examples. Curing properties of the compositions are listed in Table 5 as well.

TABLE 5

Formulation of Inventive Compositions Comprising NR and BR

| | Formulation (in phr) | | | | | | | |
|---|---|---|---|---|---|---|---|---|
| | 2-1 | 2-2 | 2-3 | 2-4 | 2-5 | 2-6 | 2-7 | 2-8 |
| SMR20 | 60 | 60 | 60 | 60 | 60 | 60 | 60 | 60 |
| Diene 140ND | 40 | 40 | 40 | 40 | 40 | 40 | 40 | 40 |
| Carbon black N121 | 55 | 55 | 55 | 55 | 55 | 55 | 55 | 55 |
| Stearic acid | 2 | 2 | 2 | 2 | 2 | 2 | 2 | 2 |
| Santoflex 6P PD | 2 | 2 | 2 | 2 | 2 | 2 | 2 | 2 |
| Sunproof Improved | 1 | 1 | 1 | 1 | 1 | 1 | 1 | 1 |
| Agerite resin D | 2 | 2 | 2 | 2 | 2 | 2 | 2 | 2 |
| Kadox 911 ZnO | 4 | 4 | 4 | 4 | 4 | 4 | 4 | 4 |
| Escorez 1102 | 0 | 12 | 4.8 | 0 | 20 | 12 | 8 | 0 |
| Cleartack W-100 | 0 | 0 | 7.2 | 12 | 0 | 8 | 12 | 20 |
| Santocure TBBS | 1.75 | 1.75 | 1.75 | 1.75 | 1.75 | 1.75 | 1.75 | 1.75 |
| Sulfur | 1.4 | 1.4 | 1.4 | 1.4 | 1.4 | 1.4 | 1.4 | 1.4 |
| Total (phr): | 169.15 | 181.15 | 181.15 | 181.15 | 189.15 | 189.15 | 189.15 | 189.15 |
| Cure test at 150° C. for 30 min at 1.67 Hz, 2.8% strain | | | | | | | | |
| ML dNm | 2.10 | 1.67 | 1.64 | 1.48 | 1.06 | 1.26 | 1.14 | 1.14 |
| MH dNm | 13.08 | 9.83 | 10.03 | 9.76 | 7.73 | 8.01 | 7.93 | 8.32 |
| $t_{90}$ min | 11.51 | 12.17 | 12.49 | 12.65 | 13.26 | 13.58 | 14.08 | 13.86 |
| Micro-dumbbell tensile test at RT | | | | | | | | |
| Modulus 100% Mpa | 5.75 | 4.29 | 4.11 | 4.13 | 3.22 | 3.46 | 3.30 | 3.52 |
| Modulus 300 Mpa | 19.15 | 14.85 | 14.23 | 14.26 | 11.21 | 11.99 | 11.52 | 12.16 |
| Tensile at break Mpa | 24.38 | 26.91 | 25.65 | 27.50 | 25.83 | 25.77 | 26.10 | 26.97 |
| Elongation at break % | 371.5 | 500.4 | 489.6 | 529.7 | 582.0 | 565.9 | 579.7 | 585.1 |
| Dynamic temperature ramp testing (10 Hz, 2° C./min, 0.20% strain) | | | | | | | | |
| T at pk G" (BR) ° C. | −95.47 | −94.48 | −90.22 | −88.53 | −94.5 | −89.78 | −87.8 | −83.78 |
| T at pk G" (NR) ° C. | −57.81 | −53.78 | −54.14 | −55.47 | −50.76 | −52.13 | −52.51 | −53.76 |
| ΔT at pk G" (NR − BR) ° C. | 37.66 | 40.7 | 36.08 | 33.06 | 43.74 | 37.65 | 35.29 | 30.02 |

It can be seen from Table 5 that a combination of two different HPAs can be utilized for tuning material properties of the immiscible blend of natural rubber (NR) and high-cis polybutadiene rubber (cis-BR). Such effects can be revealed from the dynamic temperature ramp testing of the composition bulk viscoelasticity in Table 5. $T_{peak\ G''}$ for the NR phase and the cis-BR phase is adjusted for inventive examples 2-3, 2-6, and 2-7 with a combination of two HPAs in comparison to those comparative examples containing only a single HPA 2-2, 2-4, 2-5 and 2-8.

The uneven partition of an HPA can affect filler distribution and dispersion in tire compounds made of an immiscible blend typically reinforced with fine filler particles. Thus usage of a combination of two different HPAs can be employed for influence on the viscosity of an individual polymer phase for control of blend morphology, filler distribution and dispersion in immiscible blends.

Therefore, inventors surprisingly find that due to an HPA has different affinity to different rubbers, and predominantly goes into one rubber phase in an immiscible blend of elastomers. Therefore a combination of two different HPAs can be selected for usage in compositions made of an immiscible blend, so that composition bulk viscoelasticity, blend morphology, filler distribution and dispersion in the different phases of the blend can be tuned for desired tire performance characteristics. This is also an advantage of using HPAs rather than common processing oils as an important compound ingredient.

Example 3

In example 3, a total of eight elastomeric compositions comprising a blend of NR (SMR 20) and BR (Diene 140ND) in a weight ratio of 50:50 were mixed with a Brabender mixer and then cured at 150° C. The formulations are shown in Table 6. Compositions 3-3, 3-6 and 3-7 are inventive examples comprising two different HPAs, i.e. HPA1-2 (Escorez™ 1102) and HPA2-1 (Cleartack W-100), and other compositions are comparative examples. Curing properties of the compositions are listed in Table 6 as well.

TABLE 6

Formulation of Inventive Compositions Comprising NR and BR

| | Formulation (in phr) | | | | | | | |
|---|---|---|---|---|---|---|---|---|
| | 3-1 | 3-2 | 3-3 | 3-4 | 3-5 | 3-6 | 3-7 | 3-8 |
| SMR20 | 50 | 50 | 50 | 50 | 50 | 50 | 50 | 50 |
| Diene 140ND | 50 | 50 | 50 | 50 | 50 | 50 | 50 | 50 |
| Carbon black N121 | 55 | 55 | 55 | 55 | 55 | 55 | 55 | 55 |
| Stearic acid | 2 | 2 | 2 | 2 | 2 | 2 | 2 | 2 |
| Santoflex 6P PD | 2 | 2 | 2 | 2 | 2 | 2 | 2 | 2 |
| Sunproof Improved | 1 | 1 | 1 | 1 | 1 | 1 | 1 | 1 |
| Agerite resin D | 2 | 2 | 2 | 2 | 2 | 2 | 2 | 2 |

TABLE 6-continued

Formulation of Inventive Compositions Comprising NR and BR

| | Formulation (in phr) | | | | | | | |
|---|---|---|---|---|---|---|---|---|
| | 3-1 | 3-2 | 3-3 | 3-4 | 3-5 | 3-6 | 3-7 | 3-8 |
| Kadox 911 ZnO | 4 | 4 | 4 | 4 | 4 | 4 | 4 | 4 |
| Escorez 1102 | 0 | 12 | 4.8 | 0 | 20 | 12 | 8 | 0 |
| Cleartack W-100 | 0 | 0 | 7.2 | 12 | 0 | 8 | 12 | 20 |
| Santocure TBBS | 1.75 | 1.75 | 1.75 | 1.75 | 1.75 | 1.75 | 1.75 | 1.75 |
| Sulfur | 1.4 | 1.4 | 1.4 | 1.4 | 1.4 | 1.4 | 1.4 | 1.4 |
| Total (phr): | 169.15 | 181.15 | 181.15 | 181.15 | 189.15 | 189.15 | 189.15 | 189.15 |
| Cure test at 150° C. for 30 min at 1.67 Hz, 2.8% strain | | | | | | | | |
| ML dNm | | 1.81 | 1.05 | 1.29 | 1.26 | 0.99 | 1.00 | 1.11 | 1.07 |
| MH dNm | | 11.22 | 8.36 | 8.5 | 8.21 | 7.26 | 7.29 | 7.26 | 7.78 |
| $t_{90}$ min | | 10.88 | 10.92 | 11.8 | 12.43 | 12.50 | 12.76 | 13.37 | 13.34 |
| Micro-dumbbell tensile test at RT | | | | | | | | |
| Modulus 100% Mpa | 5.19 | 3.45 | 3.55 | 3.64 | 2.80 | 2.92 | 2.93 | 3.00 |
| Modulus 300% Mpa | 16.92 | 11.59 | 12.20 | 12.31 | 9.35 | 9.86 | 10.00 | 10.24 |
| Dynamic temperature ramp testing (10 Hz, 2° C./min, 0.20% strain) | | | | | | | | |
| T at pk G" (BR) ° C. | −96.17 | −95.45 | −92.15 | −89.48 | −95.04 | −90.92 | −88.88 | −85.45 |
| T at pk G" (NR) ° C. | −58.09 | −52.43 | −55.06 | −56.08 | −49.82 | −51.73 | −53.25 | −55.47 |
| ΔT at pk G" (NR − BR) ° C. | 38.08 | 43.02 | 37.09 | 33.40 | 45.22 | 39.19 | 35.63 | 29.98 |

It can be seen from Table 6 that a combination of two different HPAs can be utilized for tuning material properties of the immiscible blend of natural rubber (NR) and high-cis polybutadiene rubber (cis-BR). Such effects can be revealed from the dynamic temperature ramp testing of composition bulk viscoelasticity in Table 6. $T_{peak\ G''}$ for the NR phase and the cis-BR phase is adjusted for inventive examples 3-3, 3-6, 3-7 with a combination of two HPAs in comparison to those comparative examples containing only a single HPA 3-2, 3-4, 3-5 and 3-8. Therefore a combination of two different HPAs can be selected for usage in compositions made of an immiscible blend, so that composition bulk viscoelasticity, blend morphology, filler distribution and dispersion in the different phases of the blend can be tuned for desired tire performance characteristics.

FIG. 1 is plots of the shift in temperature for the peak in G" against the proportion of pure monomer resin HPA 2-1 (Cleartack W-100) in the inventive elastomeric compositions, which shows that each HPA exhibits different affinity to different rubbers, where HPA 1-2 (Escorez™ 1102) exhibits a higher affinity to NR and HPA 2-1 (Cleartack W-100) exhibits a higher affinity to cis-BR, and thus HPA 1-2 predominantly goes into the NR phase while HPA 2-1 predominantly resides into the cis-BR phase. This indicates that the amount of HPA going into the different polymer phases in an immiscible blend can be controlled and rationally adjusted for desired improvement of compound bulk properties. In addition, the "distance" in temperature between the peak in G" (or tan δ) for the NR phase and the corresponding peak in G" (or tan δ) for the cis-BR phase is also consequently adjusted with usage of a combination of HPAs.

All patents and patent applications, test procedures, and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

What is claimed is:

1. A composition comprising:
   a) a first elastomer, wherein the first elastomer is natural rubber;
   b) a second elastomer, wherein the second elastomer is polybutadiene rubber;
   c) a first hydrocarbon polymer additive, wherein the first hydrocarbon polymer additive is a $C_5$ aliphatic resin; and
   d) a second hydrocarbon polymer additive, wherein the second hydrocarbon polymer additive is a dicyclopentadiene (DCPD) resin or an aromatic pure monomer resin;
   wherein the first hydrocarbon polymer additive is predominantly in a first phase comprising the first elastomer, and the second hydrocarbon polymer additive is predominantly in a second phase comprising the second elastomer.

2. The composition of claim 1, wherein the first elastomer is present from about 40 to about 90 phr and the second elastomer is present from about 10 to about 60 phr based on the total weight of the composition.

3. The composition of claim 1, wherein the first hydrocarbon polymer additive is present from about 5 to about 90 phr based on the total weight of the composition.

4. The composition of claim 1, wherein the first hydrocarbon polymer additive has a number average molecular weight Mn of from about 200 g/mole to about 3500 g/mole and a glass transition temperature Tg of from about −50° C. to about 120° C.

5. The composition of claim 1, wherein the second hydrocarbon polymer additive has a number average molecular weight Mn of from about 200 g/mole to about 3500 g/mole and a glass transition temperature Tg of from about −50° C. to about 120° C.

6. The composition of claim 1, wherein the second hydrocarbon polymer additive has a softening point of from about 0° C. to about 170° C.

7. An article comprising a first elastomer, a second elastomer, a first hydrocarbon polymer additive, and a second hydrocarbon polymer additive, wherein the first elastomer is natural rubber, the second elastomer is polybutadiene rubber, the first hydrocarbon polymer additive is a $C_5$ aliphatic resin, and the second hydrocarbon polymer additive is a dicyclopentadiene (DCPD) resin or an aromatic pure monomer resin; and wherein the first hydrocarbon polymer additive is predominantly in a first phase comprising the first elastomer, and the second hydrocarbon polymer additive is predominantly in a second phase comprising the second elastomer.

8. The article of claim 7, wherein the first hydrocarbon polymer additive has a number average molecular weight Mn of from about 200 g/mole to about 3500 g/mole and a glass transition temperature Tg of from about −50° C. to about 120° C.

9. The article of claim 7, wherein the second hydrocarbon polymer additive is an aromatic pure monomer resin having a number average molecular weight Mn of from about 220 g/mole to about 3300 g/mole and a glass transition temperature Tg of from about −48° C. to about 110° C.

10. The article of claim 7, wherein the second hydrocarbon polymer additive has a softening point of from about 0° C. to about 170° C.

11. The article of claim 7, wherein the cured elastomeric rubber article is a tire or tire component.

12. The method of making the composition of claim 1, comprising the steps of mixing:
   a) a first elastomer, wherein the first elastomer is natural rubber;
   b) a second elastomer, wherein the second elastomer is polybutadiene rubber;
   c) a first hydrocarbon polymer additive, wherein the first hydrocarbon polymer additive is a $C_5$ aliphatic resin; and
   d) a second hydrocarbon polymer additive, wherein the second hydrocarbon polymer additive is a dicyclopentadiene (DCPD) resin or an aromatic pure monomer resin.

* * * * *